United States Patent
Tokutomi et al.

(10) Patent No.: US 7,438,816 B2
(45) Date of Patent: Oct. 21, 2008

(54) METHOD FOR TREATING WATER CONTAINING AMMONIUM-NITROGEN

(75) Inventors: Takaaki Tokutomi, Tokyo (JP); Nobuhiro Orita, Tokyo (JP); Hideyo Yamauchi, Tokyo (JP)

(73) Assignee: Kurita Water industries Ltd., Tokyo (JP)

( * ) Notice: Subject to any disclaimer, the term of this patent is extended or adjusted under 35 U.S.C. 154(b) by 96 days.

(21) Appl. No.: 11/819,522

(22) Filed: Jun. 28, 2007

(65) Prior Publication Data

US 2007/0251881 A1    Nov. 1, 2007

Related U.S. Application Data

(63) Continuation of application No. 11/171,417, filed on Jul. 1, 2005, now Pat. No. 7,297,276, which is a continuation of application No. PCT/JP04/01535, filed on Feb. 13, 2004.

(30) Foreign Application Priority Data

Feb. 21, 2003  (JP) .............................. 2003-044578
Dec. 11, 2003  (JP) .............................. 2003-413509

(51) Int. Cl.
    *C02F 3/00*    (2006.01)

(52) U.S. Cl. .................... 210/610; 210/615; 210/631
(58) Field of Classification Search ......... 210/610–611, 210/615, 631
See application file for complete search history.

(56) References Cited

OTHER PUBLICATIONS

Byong-Hee Jun et al; "Stimulating Accumulation of Nitrifying Bacteria in Porous Carrier by Addition of Inorganic Carbon in a Continuous-Flow Fluidized Bed Wastewater Treatment Reactor" Journal of Bioscience and Bioengineering, vol. 89, No. 4, p. 334-339, 2000.*

* cited by examiner

*Primary Examiner*—Chester T. Barry
(74) *Attorney, Agent, or Firm*—Manabu Kanesaka

(57) ABSTRACT

Raw water containing ammonium-nitrogen is introduced into a nitrification tank and nitrification of nitrite-nitrogen by nitrite oxidizing bacteria is inhibited according to inhibition of the ammonium-nitrogen, thereby conducting stable nitrification of nitrous acid type at a high load by the action of ammonium oxidizing bacteria. Carbonate and/or bicarbonate are added into the nitrification tank 1. The inorganic carbon concentration in the nitrification tank 1 is maintained at 35 mg-C/L or more. The nitrified liquid thus obtained is introduced into a denitrification tank and denitrification reaction is conducted by the action of denitrifying bacteria with the remaining ammonium-nitrogen as an electron donor and the nitrite-nitrogen as an electron acceptor.

19 Claims, 3 Drawing Sheets

METHOD FOR TREATING WATER CONTAINING AMMONIUM-NITROGEN

CROSS REFERENCE TO THE RELATED APPLICATION

This is a continuation application of Ser. No. 11/171,417 filed on Jul. 1, 2005, now U.S. Pat. No. 7,297,276, which is a continuation application of PCT/JP2004/001535 filed Feb. 13, 2004.

FIELD OF THE INVENTION

The present invention relates to a nitrification method where raw water containing ammonium-nitrogen is introduced into a nitrification tank, and a part of the ammonium-nitrogen in the raw water is oxidized to nitrite-nitrogen by ammonium oxidizing bacteria while inhibiting nitrification of the nitrite-nitrogen by nitrite oxidizing bacteria. The present invention also relates to a denitrification method where nitrified liquid is introduced into a denitrification tank and denitrified by denitrifying bacteria in which ammonium-nitrogen as an electron donor reacts with nitrite-nitrogen as an electron acceptor.

BACKGROUND OF THE INVENTION

Ammonium-nitrogen contained in wastewater is one of causative agents of eutrophication in such as a river, a lake, and sea and should be effectively removed by wastewater treatment process. Ammonium-nitrogen in wastewater is decomposed into nitrogen gas through two-stage biological reaction processes. In a first nitrification process, the ammonium-nitrogen is oxidized into nitrite-nitrogen by ammonia oxidizing bacteria, and the nitrite-nitrogen is further oxidized into nitrate-nitrogen by nitrite oxidizing bacteria. In a second denitrification process, the nitrite-nitrogen and the nitrate-nitrogen are decomposed into nitrogen gas by denitrifying bacteria as heterotrophic bacteria where an organic substance as an electron donor is consumed.

In the conventional nitrification-denitrification process, cost of aeration for oxidizing the ammonium-nitrogen makes up the majority of the operational cost.

In the conventional nitrification-denitrification method, a large amount of an organic substance such as methanol as the electron donor is consumed in the denitrification process which produces a large amount of sludge.

A method where ammonium-nitrogen is oxidized to nitrite-nitrogen without producing nitrate-nitrogen and then the nitrite-nitrogen is denitrified may reduce its cost.

Another denitrification method is known in which ammonium-nitrogen and nitrite-nitrogen are reacted with each other by autotrophic microorganisms (hereinafter, sometimes referred to as "ANAMMOX bacteria"), wherein the ammonium-nitrogen is an electron donor and the nitrite-nitrogen is an electron acceptor. According to this method, no organic substance is added, thereby the cost could be reduced comparing to the conventional method utilizing heterotrophic denitrifying bacteria. The autotrophic microorganisms generate lower amount of sludge than that of the heterotrophic microorganisms because of lower yield of the autotrophic microorganisms, thereby reducing the amount of excess sludge compared to the method utilizing heterotrophic denitrifying bacteria. No N2O is produced during this process in contrast to the conventional nitrification-denitrification process, thereby reducing influence to the environment.

The biological denitrification process utilizing ANAMMOX bacteria was reported in Strous, M, et al., Appl. Microbiol. Biotechnol., 50, p. 589-596 (1998). The ammonium-nitrogen and nitrite-nitrogen are considered to be decomposed into nitrogen gas in the following reaction where ammonium-nitrogen and nitrite-nitrogen react with each other in a ratio of ammonium-nitrogen/nitrite-nitrogen=0.43/0.57 (molar ratio)=1/1.3 (molar ratio).

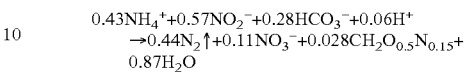

To conduct the denitrification treatment using the ANAMMOX bacteria, it is preferable to set the molar proportion of nitrite-nitrogen to 1 mole of ammonium-nitrogen to be 0.5 to 2, especially 1 to 1.5, (that is, ammonium-nitrogen/nitrite-nitrogen=2/1 to 1/2, preferably 1/1 to 1/1.5). In the treatment of raw water containing ammonium-nitrogen, it is therefore preferable that a part of the raw water is nitrified by nitrification of nitrous acid type and the rest of the raw water containing the ammonium-nitrogen and the nitrified liquid containing the nitrite-nitrogen are mixed so as to prepare water to be treated or that a part of the ammonium-nitrogen in the raw water is converted to nitrous acid so as to prepare water to be treated.

Conventionally, control methods in the nitrification process for achieving nitrification of nitrous acid type have been studied where ammonium-nitrogen is oxidized as far as nitrite-nitrogen in order not to generate nitrate-nitrogen. For example, JP 2000-61494A describes a method of utilizing inhibition by ammonium-nitrogen in a tank. JP H4-122498A describes a method of controlling dissolved oxygen (DO) concentration. EP0826639A1 describes a method of utilizing difference in growth rate of microorganisms. In these methods, only ammonium oxidizing bacteria is activated by inhibiting the nitrite oxidizing bacteria, thereby accumulating high concentration of nitrite-nitrogen in a reaction tank.

In the reaction of oxidizing ammonium-nitrogen to nitrite-nitrogen, since ammonium-nitrogen which is alkaline is oxidized into nitrite-nitrogen which is acidic, pH in the nitrification tank tends to decrease. As the pH decreases to 6.5 or less, the activity of the ammonium oxidizing bacteria significantly deteriorates. In this case, the oxidizing rate of the ammonium-nitrogen should be lower than the oxidizing rate in case of neutral range. To inhibit this, it is required to add alkaline chemicals such as sodium hydroxide to control the pH.

In the method of utilizing the inhibition by ammonium-nitrogen among the aforementioned conventional methods, ammonium-nitrogen remains at high concentrations in the treated water. Therefore, further treatment is required to oxidize the remaining ammonium-nitrogen to nitrate-nitrogen as a post process. This loses advantage of generation of nitrite-nitrogen.

In the method of controlling the DO, the concentration of oxygen as a matrix is reduced so as to lower the treatment activity per sludge. Therefore, it is hard to treat high loading.

In the method of utilizing difference in growth rate of microorganisms, concentration of sludge is not high due to chemostat reactor. Therefore, it is hard to treat high loading.

SUMMARY OF THE INVENTION

It is an object of the present invention to solve the aforementioned conventional problems, to provide a nitrification method in which raw water containing ammonium-nitrogen is introduced into a nitrification tank and stable nitrification of nitrous acid type is conducted at a high loading by the action of ammonium oxidizing bacteria, and to provide a denitrification method in which denitrification is conducted by introducing nitrified liquid obtained by the nitrification method into a denitrification tank.

According to a method for treating water containing ammonium-nitrogen of the present invention, raw water containing ammonium-nitrogen is introduced into a nitrification tank, a part of the ammonium-nitrogen in the raw water is oxidized into nitrite-nitrogen by the action of ammonium oxidizing bacteria, and nitrification of the nitrite-nitrogen by nitrite oxidizing bacteria is inhibited, thereby conducting nitrification of nitrous acid type. The process is characterized in that the inorganic carbon concentration in the nitrification tank is maintained at 35 mg-C/L or more.

Nitrified liquid obtained by the aforementioned nitrification method of the present invention is introduced into a denitrification tank and denitrification reaction is conducted by the action of denitrifying bacteria with the remaining ammonium-nitrogen as an electron donor and the nitrite-nitrogen as an electron acceptor.

In the present invention, the inorganic carbon concentration in the nitrification tank, i.e. a total of carbonate ion ($CO_3^{2-}$) concentration and bicarbonate ion ($HCO_3^-$) concentration, is kept high, thereby maintaining the ammonium oxidizing bacteria at high concentration preferentially and thus increasing the processing capacity of the ammonium oxidizing bacteria. The mechanism of such action by the present invention has not been fully understood, but is deduced as follows.

That is, the formation of pH gradient in biofilms is prevented by keeping the high inorganic carbon concentration in the nitrification tank. This maintains the pH in biofilms stable for activation of ammonium oxidizing bacteria, thereby promoting the action of the ammonium oxidizing bacteria. Therefore, the growth of the ammonium oxidizing bacteria is faster than the growth of the nitrite oxidizing bacteria. It is known that when there are a plurality of microorganisms in a competitive relationship in biofilms, microorganisms of a kind having higher growth speed gradually dominate. As the inside of the nitrification tank is kept in a state that inorganic carbon concentration is high, the ammonium oxidizing bacteria gradually becomes dominant in the biofilms while the nitrite oxidizing bacteria is gradually eliminated. Accordingly, the entire reaction is converted to the nitrous acid type so that nitrite-nitrogen is accumulated in treated water.

However, as the ammonium-nitrogen in the nitrification tank is exhausted, there is no matrix of ammonium oxidizing bacteria, whereby the aforementioned competitive relationship is lost so as to allow the action of nitrite oxidizing bacteria. Therefore, it is necessary to maintain the condition for causing ammonium-nitrogen to remain in the nitrification tank. Since the inhibition effect by ammonium-nitrogen is not an essential condition, the concentration of the remaining ammonium-nitrogen is not necessary to be high and 10 to 50 mg-N/L should be enough.

According to the present invention, in case of adding carbonate and/or bicarbonate into the nitrification tank, it is preferable that carbonate and/or bicarbonate are added such that the molar ratio of inorganic carbon relative to ammonium-nitrogen in the raw water, i.e. C/N ratio, becomes 0.5 or more or such that the inorganic carbon concentration in the nitrification tank becomes 35 mg-C/L or more. In addition, it is preferable to use alkaline solution absorbing exhaust combustion gas as the carbonate and/or bicarbonate.

According to the nitrification method of the present invention, stable nitrification of nitrous acid type can be conducted at a high load by introducing raw water containing ammonium-nitrogen into a nitrification tank and by the action of ammonium oxidizing bacteria. According to the denitrification method of the present invention, efficient denitrification can be conducted by introducing nitrified liquid thus obtained into a denitrification tank and by the action of ANAMMOX bacteria.

PREFERRED EMBODIMENTS OF THE INVENTION

Hereinafter, preferred embodiments of the present invention will be described in detail with reference to the attached drawings.

Figure 1:
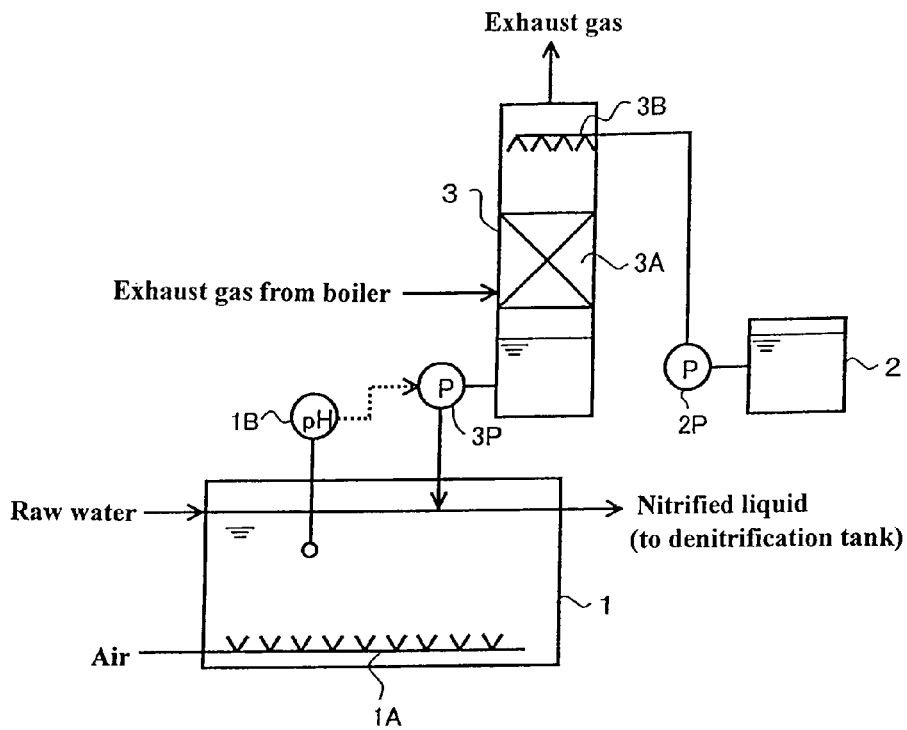
FIG. 1 is a schematic structural illustration showing a nitrification system suitable for carrying out a nitrification method of the present invention.

FIG. 1 is a schematic structural illustration showing a nitrification system suitable for carrying out a nitrification method of the present invention.

Raw water (water containing ammonium-nitrogen) is introduced into a nitrification tank (aeration tank) 1 and is brought in contact with nitrifying sludge under aerobic condition by an air diffuser tube 1A. In this manner, nitrification treatment is conducted, thereby discharging nitrified liquid.

In the nitrification tank 1, pH is lowered because the ammonium-nitrogen is nitrified to generate nitrite-nitrogen so that it is required to add alkaline chemicals to control the pH. In this embodiment, carbon dioxide is absorbed in alkalis for controlling the pH to produce carbon dioxide-absorbed liquid. The liquid is added into the nitrification tank 1 for the purpose of controlling the pH and the purpose of adding carbonate.

There is no specific limitation on carbon dioxide so that the carbon dioxide may be various carbon dioxide-containing exhaust gas such as exhaust combustion gas from a boiler or the like, exhaust gas containing carbon dioxide from the aeration tank, exhaust gas from a denitrification tank, and biogas from a methane fermentation tank. In this embodiment, boiler exhaust gas is employed.

There is no specific limitation on alkalis for absorbing carbon dioxide in the carbon dioxide-containing exhaust gas. As the alkalis, caustic soda solution containing about from 0.1% to 25% caustic soda by weight is suitably used.

Caustic soda solution in a NaOH tank 2 is sprinkled through a diffuser tube 3B above an exhaust gas absorbing tower 3 by a pump 2P. The caustic soda solution sprinkled comes in countercurrent flow contact with boiler exhaust gas at a loading layer 3A in the exhaust gas absorbing tower 3 so as to absorb carbon dioxide in the boiler exhaust gas. The carbon dioxide-absorbed liquid obtained by absorbing the carbon dioxide in the exhaust gas absorbing tower 3 is added into the nitrification tank 1 by a pump 3P.

A pH value of the liquid in the nitrification tank 1 is measured by a pH sensor 1B. Based on the pH level thus measured, the pump 3P is controlled to control the supply of the carbon dioxide-absorbed liquid from the exhaust gas absorbing tower 3 to the nitrification tank 1.

By adding carbonate and/or bicarbonate into the nitrification tank 1, the inorganic carbon concentration in the nitrification tank 1 is kept high so as to allow nitrification of nitrous acid type. As the carbonate and/or bicarbonate to be added, reagents such as sodium carbonate, sodium bicarbonate, and potassium bicarbonate may be employed. However, carbonate and bicarbonate are expansive compared to caustic soda and have poor handling property because industrial product is power. On the other hand, when liquid composed of alkaline chemicals such as caustic soda absorbing carbon dioxide in exhaust gas containing the carbon dioxide such as boiler exhaust gas is added into the nitrification tank 1 as shown in FIG. 1, effective use of exhaust gas is achieved. The carbon dioxide-absorbed liquid is easily handled.

The amount of the carbonate and/or bicarbonate to be added to the nitrification tank 1 is preferably an amount satisfying at least one of the following conditions (1) and (2):

(1) The inorganic carbon concentration in the nitrification tank becomes 35 mg-C/L or more, preferably 50 mg-C/L or more, more preferably 100 mg-C/L or more, for example from 100 to 150 mg-C/L.

(2) The molar ratio of inorganic carbon relative to ammonium-nitrogen in raw water (C/N ratio) becomes 0.5 or more, preferably from 0.5 to 2.0.

When the inorganic carbon concentration is lower than the aforementioned (1) range, it may be impossible to obtain the advantageous effect by keeping the inorganic carbon concentration in the nitrification tank 1 high. When the C/N ratio is lower than the aforementioned (2) range, it may be impossible to maintain the pH suitable for nitrification only by the carbonate and/or bicarbonate.

To conduct stable nitrification of nitrous acid type, the ratio $C_A/C_N$ between the ammonium-nitrogen concentration $C_A$ and the nitrite-nitrogen concentration $C_N$ of the nitrified liquid flowing out of the nitrification tank 1 is preferably set to be from 1/1 to 1/1.5, especially from 1/1.32 to 1/1.4. Therefore, it is preferable to control the pH in the nitrification tank 1 to be from 6 to 8, especially from 7.3 to 7.8.

In case of adding carbon dioxide-absorbed liquid into the nitrification tank 1, it is preferable to set the alkali concentration and contact conditions in the exhaust gas absorbing tower in such a manner as to satisfy both the aforementioned inorganic carbon concentration and/or the C/N ratio and the pH level by addition of the carbon dioxide-absorbed liquid.

To achieve stable nitrification of nitrous acid type, the temperature of liquid in the nitrification tank 1 is preferably set to be from 10° C. to 40° C. When the temperature exceeds 40° C., the nitrification reaction is stopped. On the other hand, when the temperature is lower than 10° C., the nitrification activity becomes poor.

The nitrified liquid flowing out of the nitrification tank 1 is introduced into a denitrification tank (not shown) where it is subjected to denitrification treatment by the action of ANAMMOX bacteria for denitrification with the ammonium-nitrogen acting as an electron donor and the nitrite-nitrogen acting as an electron acceptor.

There is no specific limitation on treatment condition in the denitrification tank. Generally, the following condition is preferably employed.

pH: 6 to 9, especially 6.5 to 8.0
Temperature: 10° C. to 40° C., especially 20° C. to 35° C.
BOD concentration: 0 to 50 mg/L, especially 0 to 20 mg/L
Nitrogen loading rate: 0.1 to 10 kg-N/m$^3$/day, especially 0.2 to 5 kg-N/m$^3$/day In the present invention, there are no specific limitations on the form of the nitrification tank and the denitrification tank. When using a tank of biofilm type such as a fixed bed tank, a fluidized bed tank, a granule process tank, and a carrier addition process tank, it allows omission of a settling tank for solid-liquid separation as a subsequent stage. When using a tank of sludge suspension type, water flowing out of the tank is subjected to solid-liquid separation at a settling tank or a membrane separation device and sludge separated is returned to the tank, thereby holding sludge within the system. Alternatively, the nitrification tank may be an air-lift aeration tank, while the denitrification tank may be a gas-lift tank using nitrogen gas instead of air. Further, the nitrification tank may be a USB (Upflow Sludge Bed) tank in which a granule sludge bed of ANAMMOX bacteria is formed. In this case, it allows omission of a settling tank as a subsequent stage.

Liquid flowing out of the denitrification tank may be subjected to denitrification treatment, that is, may be introduced into a second denitrification tank where organic materials such as methanol is added and agitated so that nitric acid generated by ANAMMOX reaction and the remaining nitrite-nitrogen are decomposed into nitrogen gas by denitrifying bacteria under an anaerobic condition. Liquid flowing out of the denitrification tank may be introduced again into the aeration tank to treat the remaining BOD components under an anaerobic condition.

Hereinafter, the present invention will be described in more detail with reference to Examples, Comparative Examples and Reference Example.

EXAMPLE 1, COMPARATIVE EXAMPLE 1

Nitrification of nitrous acid type was conducted using the system shown in FIG. 1. Properties of raw water and specifications and conditions of the system used were as follows.

Raw water: water having $NH_4$-N concentration 500 mg/L obtained by adding ammonium sulfate into treated sewage Nitrification tank: dimensions 250 mm×250 mm×1500 mm (height), volume 90 L (water level about 1400 mm)

Organism carrier in the nitrification tank: 3-mm-square sponge, about 30 L

Temperature of water: 32° C.

DO concentration: 1.5 mg/L

At the start of treatment, the nitrification tank was acclimated as follows. To attach microorganisms (ammonium oxidizing bacteria or the like) to the sponge carrier, yeast extract as BOD source was added into the nitrification tank with a loading rate of 0.5 kg/m$^3$/day and the raw water (water obtained by adding ammonium sulfate as a nitrogen source into treated sewage) was introduced into the nitrification tank with a loading rate of 2 kg-N/m$^3$/day. As alkali for neutralization, 4 wt % caustic soda solution was used to control the pH of the nitrification tank to be 7.6.

At a time when the ammonium oxidizing bacteria was carried by the sponge and the loading converted into nitrous acid became 1.0 kg-N/m$^3$/day, the following treatment was conducted.

In Comparative Example 1, the pouring of yeast extract as BOD source was stopped and the system operation was continued.

In Example 1, the pouring of yeast extract was stopped. At the same time, carbon dioxide-absorbed liquid prepared by blowing exhaust gas from a gas boiler into caustic soda solution for neutralization so that carbon dioxide was absorbed in the caustic soda solution was added into the nitrification tank to make the inorganic carbon concentration to be 100 mg-C/L and the system operation was continued.

The amount of ammonium-nitrogen converted to nitrite-nitrogen ($NO_2$-N) and change with time in nitrate-nitrogen concentration were shown in Table 1.

TABLE 1

|  | Example 1 | | Comparative Example 1 | |
| --- | --- | --- | --- | --- |
| Elapsed days | Amount converted to $NO_2$—N (kg-N/m₃/day) | $NO_3$—N in nitrified liquid (mg-N/L) | Amount converted to $NO_2$—N (kg-N/m₃/day) | $NO_3$—N in nitrified liquid (mg-N/L) |
| 1 | 1.3 | 2 | 0.8 | 2 |
| 2 | 1.5 | 3 | 0.7 | 4 |
| 3 | 1.5 | 2 | 0.7 | 8 |
| 4 | 1.6 | 1 | 0.7 | 14 |
| 5 | 1.5 | 3 | 0.7 | 30 |
| 6 | 1.6 | 1 | 0.6 | 45 |

As apparent from Table 1, in Comparative Example 1 without addition of carbon dioxide-absorbed liquid, the amount converted to $NO_2$-N decreased with time and oxidation of nitrous acid occurred so as to produce $NO_3$-N. On the other hand, in Example 1 with addition of carbon dioxide-absorbed liquid, the amount converted to $NO_2$-N increased and the $NO_3$-N concentration of the treated water was stable.

EXAMPLE 2

Nitrified liquid having NO2-N concentration from 280 to 290 mg/L, $NH_4$-N concentration from 207 to 219 mg/L, $NO_3$-N concentration from 1 to 3 mg/L obtained in Example 1 was further introduced into a denitrification tank so that the liquid was subjected to nitrification-denitrification treatment continuously conducted. The specifications and conditions of the denitrification tank were as follows.

Denitrification tank: dimensions 200 mm×200 mm×1500 mm (height), volume 50 L (water level about 1250 mm)

pH: from 7.6 to 8.2

Temperature: 32° C.

BOD concentration: 1.0 mg/L or less

In addition, 500 g of ANAMMOX bacteria granule was entered into the denitrification tank.

Water flowing out of the denitrification tank was treated water directly.

As a result, high quality treated water having $NH_4$-N concentration 1.2 mg/L, $NO_2$-N concentration from 0.2 to 1.6 mg/L and $NO_3$-N concentration from 10 to 20 mg/L could be stably obtained for a long period of time.

EXAMPLE 3, REFERENCE EXAMPLE 1

A nitrification tank (aeration tank) of 2.3 L in volume was filled with a sponge carrier at a filling rate of 40%. Synthetic wastewater mainly consisting of ammonium sulfate and having $NH_4$-N concentration from 400 to 500 mg-N/L was poured into the nitrification tank and nitrification of nitrous acid type by means of ammonium oxidizing bacteria was conducted as a batch process under condition that pH was set to 7.5 and temperature of water was 30° C.

In Reference Example 1, the nitrification reaction was conducted by normal aeration without artificially adding carbonate ion. The carbonate ion concentration in water depended on the carbon dioxide concentration in air and was 5 mg/L or less (No. 1).

In Example 3, the aeration was conducted with mixed gas. The mixing proportion between air and carbon dioxide of the mixed gas for the aeration was changed variously such that the inorganic carbon concentration in the nitrification tank became 40 mg-C/L (No. 2), 80 mg-C/L (No. 3), or 160 mg-C/L (No. 4). Relative values of the oxidation rate of ammonium-nitrogen and the oxidation rate of nitrite-nitrogen at the respective inorganic carbon concentrations relative to the oxidation rate of ammonium-nitrogen and the oxidation rate of nitrite-nitrogen in case of aeration without mixing carbon dioxide (reaction rate relative ratios) were calculated and the results are shown in FIG. 2.

In Reference Example 1, phosphate ion having pH buffering effect was added instead of sodium carbonate with $NaH_2PO_4$ such that the phosphate ion concentration became 200 mg-P/L. The oxidation rate of ammonium-nitrogen and the oxidation rate of nitrite-nitrogen in this case were also measured. Relative values of the oxidation rate of ammonium-nitrogen and the oxidation rate of nitrite-nitrogen relative to the oxidation rate of ammonium-nitrogen and the oxidation rate of nitrite-nitrogen in case of no addition (No. 1) (reaction rate relative ratios) are calculated and the results are shown in FIG. 2.

Figure 2:
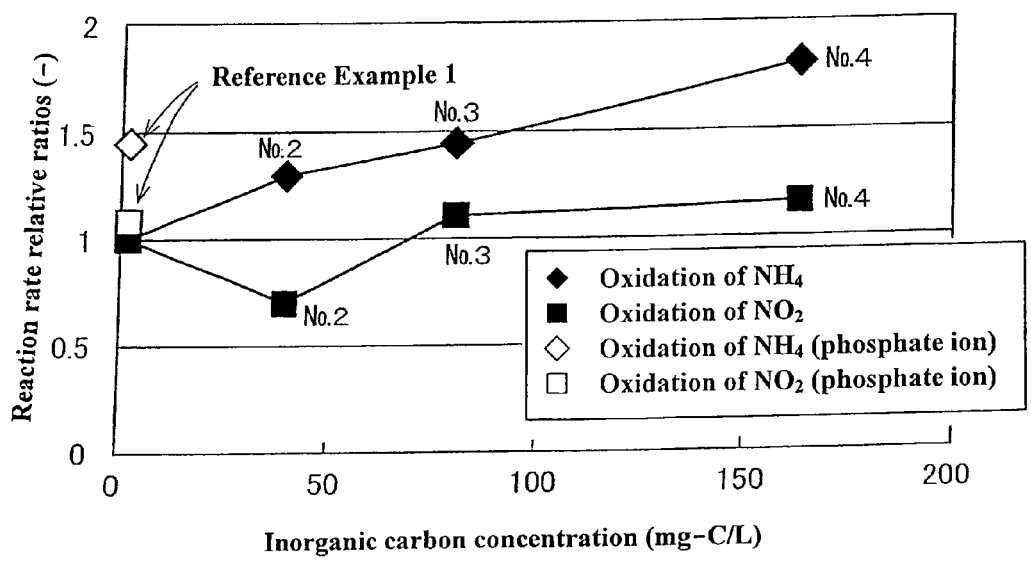
FIG. 2 is a graph showing reaction rate relative ratios in oxidation rate of ammonium-nitrogen and oxidation rate of nitrite-nitrogen in Example 3 and Reference Example 1.

It is found from FIG. 2 that as the inorganic carbon concentration in the nitrification tank is higher, only the oxidation reaction of the ammonium-nitrogen is promoted so as to achieve good nitrification of nitrous acid type. Also in Reference Example 1 in which phosphate ion was added, the reaction rate relative ratios of ammonium-nitrogen increased. From this, it is found that phosphate ion also promotes oxidation of ammonium-nitrogen because the pH buffering function of the phosphate ion prevents pH gradient in biofilms. However, phosphate ion is not preferable because phosphate ion in concentrated form is entered into wastewater so that treatment for phosphor is necessary as a subsequent process.

EXAMPLE 4

Figure 3:
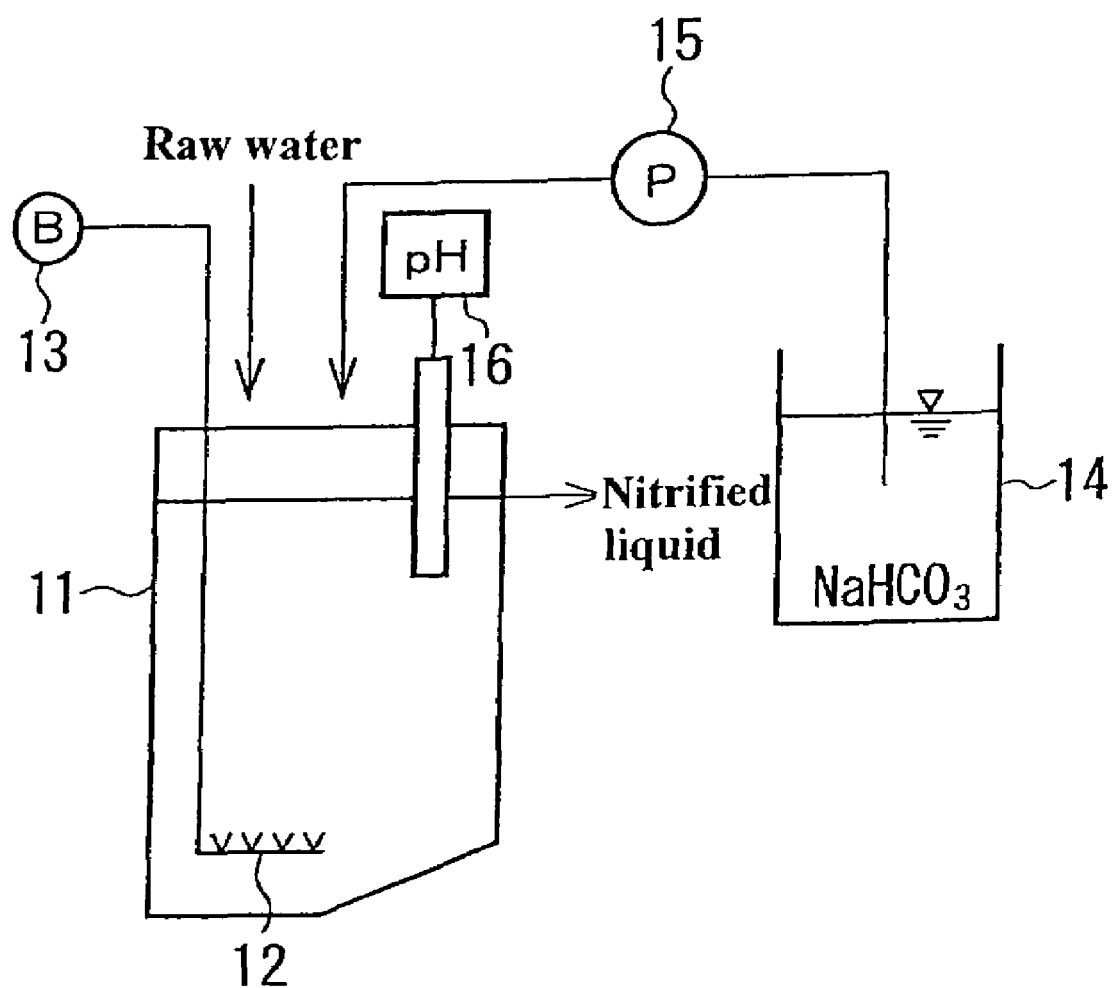
FIG. 3 is a schematic structural illustration showing another nitrification system suitable for carrying out a nitrification method of the present invention.

The method of the present invention was carried out with an experimental system shown in FIG. 3 in continuous processing manner.

Raw water was supplied continuously into a nitrification tank 11 and was aerated with air sent from a blower 13 through an air diffuser tube 12. Sodium bicarbonate solution in a tank 14 was supplied to the nitrification tank 11 by a pump 15. The pH of liquid in the tank 11 was detected by a pH meter 16. A sponge carrier was accommodated in the tank 11.

Conditions for the experiment were as follows:

Volume of the tank 11: 2.3 L Volume of the sponge carrier: 40% of volume of the tank 11

Raw water: synthetic wastewater mainly consisting of ammonium sulfate ($NH_4$-N concentration 100 mg/L)

Flow volume of raw water: about 50 L/d

Hydraulic retention time (HRT): about 2 hours pH in the tank 11: 7.5

Temperature of water in the tank 11: 30° C.

$NaHCO_3$ concentration of ammonium bicarbonate solution in the tank 14: 50 g/L

Amount of ammonium bicarbonate solution to be added: 500 mL/day

Amount of air for aeration from the air diffuser tube 12: 2 L/min

Figure 4:
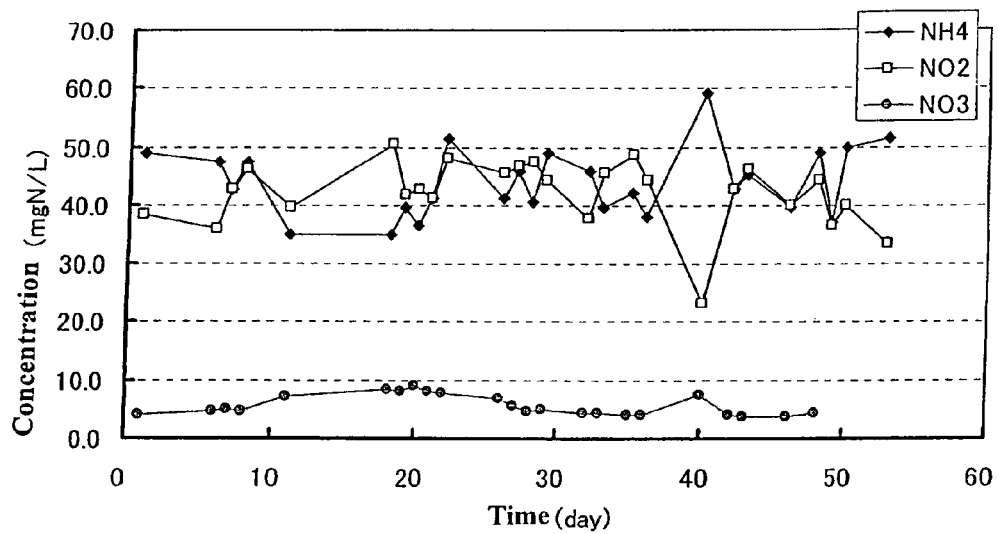
FIG. 4 is a graph showing results (change with time in nitrogen compound concentration) of experiments with the system shown in FIG. 3.
Figure 5:
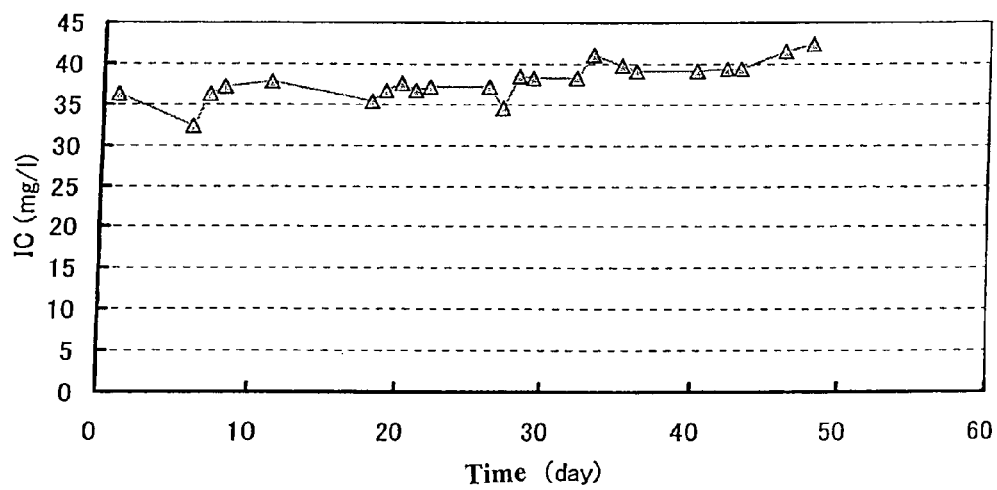
FIG. 5 is a graph showing results (change with time in inorganic carbon concentration) of experiments with the system shown in FIG. 3.

Activated sludge containing ammonium oxidizing bacteria was entered into the tank 11 and the system was operated under the aforementioned conditions. Changes with time of $NH_4$-N, $NO_2$-N, and $NO_3$-N in the nitrified water flowing out of the tank 11 were measured and the measured values are shown in FIG. 4. The inorganic carbon concentration in the tank 11 was measured and the measured values are shown in FIG. 5. As shown in FIG. 4 and FIG. 5, it was found from the experiment that the reaction of nitrous acid type could be maintained even under condition that the residual concentration of inorganic carbon in the tank was from 35 to 40 mg/L.

What is claimed is:

1. A method for treating water containing ammonium-nitrogen in which raw water containing ammonium-nitrogen is introduced into a nitrification tank, a part of the ammonium-nitrogen in the raw water is oxidized into nitrite-nitrogen by the action of ammonium oxidizing bacteria, and nitrification of the nitrite-nitrogen by nitrite oxidizing bacteria is inhibited, thereby conducting nitrification of nitrous acid,
   wherein inorganic carbon concentration in the nitrification tank is maintained at 35 mg-C/L or more for keeping nitrite-nitrogen in the tank.

2. A method for treating water containing ammonium-nitrogen as claimed in claim 1, wherein the inorganic carbon concentration in the nitrification tank is maintained at 50 mg-C/L or more.

3. A method for treating water containing ammonium-nitrogen as claimed in claim 1, wherein the inorganic carbon concentration in the nitrification tank is maintained at 35 to 150 mg-C/L.

4. A method for treating water containing ammonium-nitrogen as claimed in claim 1, wherein at least one of carbonate and bicarbonate is added into the nitrification tank.

5. A method for treating water containing ammonium-nitrogen as claimed in claim 4, wherein at least one of carbonate and bicarbonate is added such that molar C/N ratio of inorganic carbon relative to ammonium-nitrogen in the raw water becomes 0.5 or more.

6. A method for treating water containing ammonium-nitrogen as claimed in claim 5, wherein the C/N ratio becomes 0.5 to 2.0.

7. A method for treating water containing ammonium-nitrogen as claimed in claim 5, wherein liquid obtained by absorbing exhaust combustion gas into an alkaline solution, is added into the nitrification tank in order to add at least one of carbonate and bicarbonate into the nitrification tank.

8. A method for treating water containing ammonium-nitrogen as claimed in claim 7, wherein the alkaline solution is caustic soda solution.

9. A method for treating water containing ammonium-nitrogen as claimed in claim 8, wherein concentration of caustic soda in the caustic soda solution is from 0.1% to 25% by weight.

10. A method for treating water containing ammonium-nitrogen as claimed in claim 1, wherein ratio $C_A/C_N$ between ammonium-nitrogen concentration $C_A$ and nitrite-nitrogen concentration $C_N$ of the nitrified liquid flowing out of the nitrification tank is from 1/1 to 1/1.5.

11. A method for treating water containing ammonium-nitrogen as claimed in claim 1, wherein ratio $C_A/C_N$ between ammonium-nitrogen concentration $C_A$ and nitrite-nitrogen concentration $C_N$ of the nitrified liquid flowing out of the nitrification tank is from 1/1.32 to 1/1.4.

12. A method for treating water containing ammonium-nitrogen as claimed in claim 1, wherein pH in the nitrification tank is set to be from 6 to 8.

13. A method for treating water containing ammonium-nitrogen as claimed in claim 1, wherein pH in the nitrification tank is set to be from 7.3 to 7.8.

14. A method for treating water containing ammonium-nitrogen as claimed in claim 1, wherein the temperature of the liquid in the nitrification taken is maintained within a range of about 10° C. to about 40° C.

15. A method for treating water containing ammonium-nitrogen as claimed in claim 1, wherein the nitrification tank is aerated with a gas enriched with carbon dioxide.

16. A method for treating water containing ammonium-nitrogen as claimed in claim 1, comprising using combustion gas as to enrich the gas with which the nitrification tank is aerated.

17. A method for treating water containing ammonium-nitrogen as claimed in claim 1, further introducing a liquid containing carbon dioxide extracted from combustion gas into the nitrification tank.

18. A method for treating water containing ammonium-nitrogen as claimed in claim 14, wherein nitrified liquid from the nitrification tank is introduced into a denitrification tank and denitrification reaction is conducted by action of denitrifying bacteria with remaining ammonium-nitrogen acting as an electron donor and the nitrite-nitrogen acting as an electron acceptor.

19. A method for treating water containing ammonium-nitrogen as claimed in claim 18, wherein the denitrifying bacteria is anaerobic ammonium oxidation bacteria.

* * * * *